(12) United States Patent
Miller et al.

(10) Patent No.: US 6,553,366 B1
(45) Date of Patent: Apr. 22, 2003

(54) ANALYTIC LOGICAL DATA MODEL

(75) Inventors: Timothy Edward Miller, Temecula, CA (US); Brian Don Tate, Escondido, CA (US); Anthony Lowell Rollins, San Diego, CA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/806,678

(22) PCT Filed: Oct. 1, 1999

(86) PCT No.: PCT/US99/23019

§ 371 (c)(1),
(2), (4) Date: Apr. 2, 2001

(87) PCT Pub. No.: WO00/20998

PCT Pub. Date: Apr. 13, 2000

Related U.S. Application Data

(60) Provisional application No. 60/102,831, filed on Oct. 2, 1998.

(51) Int. Cl.[7] .................................................. G06F 17/30
(52) U.S. Cl. .......................... 707/2; 707/100; 707/101; 707/104; 707/6; 707/3; 707/4
(58) Field of Search ................................. 707/100, 101, 707/102, 2, 3, 4, 104, 6

(56) References Cited

U.S. PATENT DOCUMENTS

| | | |
|---|---|---|
| 5,412,806 A | 5/1995 | Du et al. |
| 5,448,727 A | 9/1995 | Annevelink |
| 5,590,322 A | 12/1996 | Harding et al. |
| 5,701,400 A | 12/1997 | Amado |
| 5,710,915 A | 1/1998 | McElhiney |
| 5,734,887 A | 3/1998 | Kingberg et al. |
| 5,787,413 A | 7/1998 | Kauffman et al. |
| 5,787,425 A | 7/1998 | Bigus |
| 5,799,310 A | 8/1998 | Anderson et al. |
| 5,806,066 A | 9/1998 | Golshani et al. |
| 5,895,465 A | 4/1999 | Guha |
| 6,421,665 B1 * | 7/2002 | Brye et al. ................ 707/3 |
| 6,438,552 B1 * | 8/2002 | Tate ........................ 707/10 |

OTHER PUBLICATIONS

G. Graefe et al., "On the Efficient Gathering of Sufficient Statistics for Classification from Large SQL Database," Microsoft Corporation, Abstract, © 1998, 5 pages.

P.S. Bradley et al., "Scaling EM (Expectation–Maximization) Clustering to Large Database," Microsoft Corporation, Technical Report, Feb. 1999, 21 pages.

* cited by examiner

Primary Examiner—Jean M. Corrielus
(74) Attorney, Agent, or Firm—Gates & Cooper

(57) ABSTRACT

A method, apparatus (1), and article of manufacture for performing data mining applications (110) in a relational database management system (114). An analytic logic data model (LDM) provides logical entity and attribute definitions for advanced analytic processing (112) performed by the relational database management system directly against the relational database.

21 Claims, 3 Drawing Sheets

ANALYTIC LOGICAL DATA MODEL

CROSS-REFERENCE TO RELATED APPLICATIONS

This application claims the benefit under 35 U.S.C. Section 119(e) of the co-pending and commonly-assigned U.S. provisional patent application Ser. No. 60/102,831, filed Oct. 2, 1998, by Timothy E. Miller, Brian D. Tate, James D. Hildreth, Miriam H. Herman, Todd M. Brye, and James E. Pricer, entitled Teradata Scalable Discovery, which application is incorporated by reference herein.

This application is also related to the following co-pending and commonly-assigned utility patent applications:

Application Ser. No. PCT/US99/23019, filed on same date herewith, by Timothy E. Miller, Brian D. Tate, James D. Hildreth, Todd M. Brye, Anthony L. Rollins, James E. Pricer, and Tej Anand, entitled SQL-Based Analytic Algorithms, Application Ser. No. 09/410,528, filed on same date herewith, by Brian D. Tate, James E. Pricer, Tej Anand, and Randy G. Kerber, entitled SQL-Based Analytic Algorithm for Association, Application Ser. No. 09/410,531, filed on same date herewith, by James D. Hildreth, entitled SQL-Based Analytic Algorithm for Clustering, Application Ser. No. 09/410,531, filed on same date herewith, by Todd M. Brye, entitled SQL-Based Analytic Algorithm for Rule Induction, Application Ser. No. 09/411,818, filed on same date herewith, by Brian D. Tate, entitled SQL-Based Automated Histogram Bin Data Derivation Assist, now U.S. Pat. No. 6,438,552, Application Ser. No. 09/410,534, filed on same date herewith, by Brian D. Tate, entitled SQL-Based Automated, Adaptive, Histogram Bin Data Description Assist, now U.S. Pat. No. 6,938,552, Application Ser. No. PCT/US99/22,995, filed on same date herewith, by Timothy E. Miller, Brian D. Tate, Miriam H. Herman, Todd M. Brye, and Anthony L. Rollins, entitled Data Mining Assists in a Relational Database Management System, Application Ser. No. 09/212,809, filed on same date herewith, by Todd M. Brye, Brian D. Tate, and Anthony L. Rollins, entitled SQL-Based Data Reduction Techniques for Delivering Data to Analytic Tools, and now U.S. Pat. No. 6,421,665, Application Ser. No. PCT/US99/23,031, filed on same date herewith, by Timothy E. Miller, Miriam H. Herman, and Anthony L. Rollins, entitled Techniques for Deploying Analytic Models in Parallel, all of which are incorporated by reference herein.

BACKGROUND OF THE INVENTION

1. Field of the Invention

This invention relates in general to a relational database management system, and in particular, to an analytic logical data model used for data mining applications in a relational database management system.

2. Description of Related Art

Relational databases are the predominate form of database management systems used in computer systems. Relational database management systems are often used in so-called "data warehouse" applications where enormous amounts of data are stored and processed. In recent years, several trends have converged to create a new class of data warehousing applications known as data mining applications. Data mining is the process of identifying and interpreting patterns in databases, and can be generalized into three stages.

Stage one is the reporting stage, which analyzes the data to determine what happened. Generally, most data warehouse implementations start with a focused application in a specific functional area of the business. These applications usually focus on reporting historical snap shots of business information that was previously difficult or impossible to access. Examples include Sales Revenue Reporting, Production Reporting and Inventory Reporting to name a few.

Stage two is the analyzing stage, which analyzes the data to determine why it happened. As stage one end-users gain previously unseen views of their business, they quickly seek to understand why certain events occurred; for example a decline in sales revenue. After discovering a reported decline in sales, data warehouse users will then obviously ask, "Why did sales go down?" Learning the answer to this question typically involves probing the database through an iterative series of ad hoc or multidimensional queries until the root cause of the condition is discovered. Examples include Sales Analysis, Inventory Analysis or Production Analysis.

Stage three is the predicting stage, which tries to determine what will happen. As stage two users become more sophisticated, they begin to extend their analysis to include prediction of unknown events. For example, "Which end-users are likely to buy a particular product", or "Who is at risk of leaving for the competition?" It is difficult for humans to see or interpret subtle relationships in data, hence as data warehouse users evolve to sophisticated predictive analysis they soon reach the limits of traditional query and reporting tools. Data mining helps end-users break through these limitations by leveraging intelligent software tools to shift some of the analysis burden from the human to the machine, enabling the discovery of relationships that were previously unknown.

Many data mining technologies are available, from single algorithm solutions to complete tool suites. Most of these technologies, however, are used in a desktop environment where little data is captured and maintained. Therefore, most data mining tools are used to analyze small data samples, which were gathered from various sources into proprietary data structures or flat files. On the other hand, organizations are beginning to amass very large databases and end-users are asking more complex questions requiring access to these large databases.

Unfortunately, most data mining technologies cannot be used with large volumes of data. Further, most analytical techniques used in data mining are algorithmic-based rather than data-driven, and as such, there are currently little synergy between data mining and data warehouses. Moreover, from a usability perspective, traditional data mining techniques are too complex for use by database administrators and application programmers.

Thus, there is a need to scale data mining applications to large databases. In addition, there is a need in the art for improved techniques of data extraction from large databases for the purposes of data mining. Moreover, there is a need in the art for improved interfaces between large databases and data mining applications.

SUMMARY OF THE INVENTION

To overcome the limitations in the prior art described above, and to overcome other limitations that will become apparent upon reading and understanding the present specification, the present invention discloses a method, apparatus, and article of manufacture for performing data mining applications in a massively parallel relational database management system (RDBMS). An analytic logical data model (LDM) provides logical entity and attribute definitions for advanced analytic processing performed by the relational database management system directly against the relational database.

An object of the present invention is to provide more efficient usage of parallel processor computer systems. An object of the present invention is to provide a foundation for data mining tool sets in relational database management systems. Further, an object of the present invention is to allow data mining of large databases.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

OVERVIEW

The present invention provides a relational database management system (RDBMS) that supports data mining operations of relational databases. In essence, advanced analytic processing capabilities for data mining applications are placed where they belong, i.e., close to the data. Moreover, the results of these analytic processing capabilities can be made to persist within the database or can be exported from the database. These analytic processing capabilities and their results are exposed externally to the RDBMS by an application programmable interface (API).

According to the preferred embodiment, the data mining process is an iterative approach referred to as a "Knowledge Discovery Analytic Process" (KDAP). There are six major tasks within the KDAP:

1. Understanding the business objective.
2. Understanding the source data available.
3. Selecting the data set and "pre-processing" the data.
4. Designing the analytic model.
5. Creating and testing the models.
6. Deploying the analytic models.

The present invention provides various components for addressing these tasks:

An RDBMS that executes Structured Query Language (SQL) statements against a relational database.

An analytic Application Programming Interface (API) that creates scalable data mining functions comprised of complex SQL statements.

Application programs that instantiate and parameterize the analytic API.

Analytic algorithms utilizing:
  Extended ANSI SQL statements,
  a Call Level Interface (CLI) comprised of SQL staterments and programmatic iteration, and
  a Data Reduction Utility Program comprised of SQL statements and programmatic iteration.

An analytical logical data model (LDM) that stores results from and information about the advanced analytic processing in the RDBMS.

A parallel deployer that controls parallel execution of the results of the analytic algorithms that are stored in the analytic logical data model.

The benefits of the present invention include:
  Data mining of very large databases directly within a relational database.
  Management of analytic results within a relational database.
  A comprehensive set of analytic operations that operate within a relational database management system.
  Application integration through an object-oriented API.

These components and benefits are described in more detail below.

HARDWARE ENVIRONMENT

Figure 1:
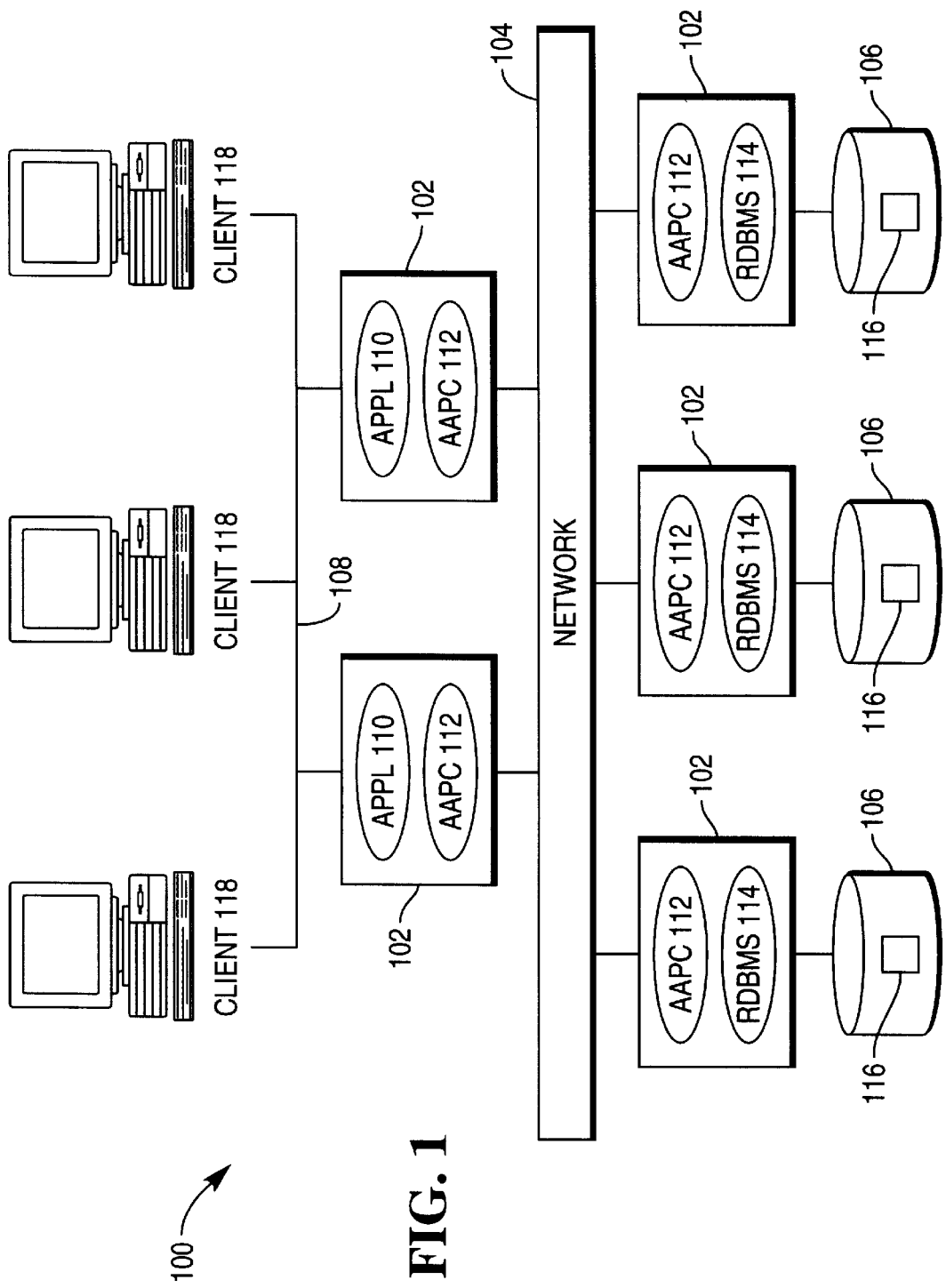
FIG. 1 is a block diagram that illustrates an exemplary computer hardware environment that could be used with the preferred embodiment of the present invention.

FIG. 1 is a block diagram that illustrates an exemplary computer hardware environment that could be used with the preferred embodiment of the present invention. In the exemplary computer hardware environment, a massively parallel processing (MPP) computer system 100 is comprised of one or more processors or nodes 102 interconnected by a network 104. Each of the nodes 102 is comprised of one or more processors, random access memory (RAM), read-only memory (ROM), and other components. It is envisioned that attached to the nodes 102 may be one or more fixed and/or removable data storage units (DSUs) 106 and one or more data communications units (DCUs) 108, as is well known in the art.

Each of the nodes 102 executes one or more computer programs, such as a Data Mining Application (APPL) 110 performing data mining operations, Advanced Analytic Processing Components (AAPC) 112 for providing advanced analytic processing capabilities for the data mining operations, and/or a Relational Database Management System (RDBMS) 114 for managing a relational database 116 stored on one or more of the DSUs 106 for use in the data mining applications, wherein various operations are performed in the APPL 110, AAPC 112, and/or RDBMS 114 in response to commands from one or more Clients 118. In alternative embodiments, the APPL 110 may be executed in one or more of the Clients 118, or on an application server on a different platform attached to the network 104.

Generally, the computer programs are tangibly embodied in and/or retrieved from RAM, ROM, one or more of the DSUs 106, and/or a remote device coupled to the computer system 100 via one or more of the DCUs 108. The computer programs comprise instructions which, when read and executed by a node 102, causes the node 102 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention. In addition, it should be understood that the present invention may also apply to other computer programs than those disclosed herein.

LOGICAL ARCHITECTURE

Figure 2:
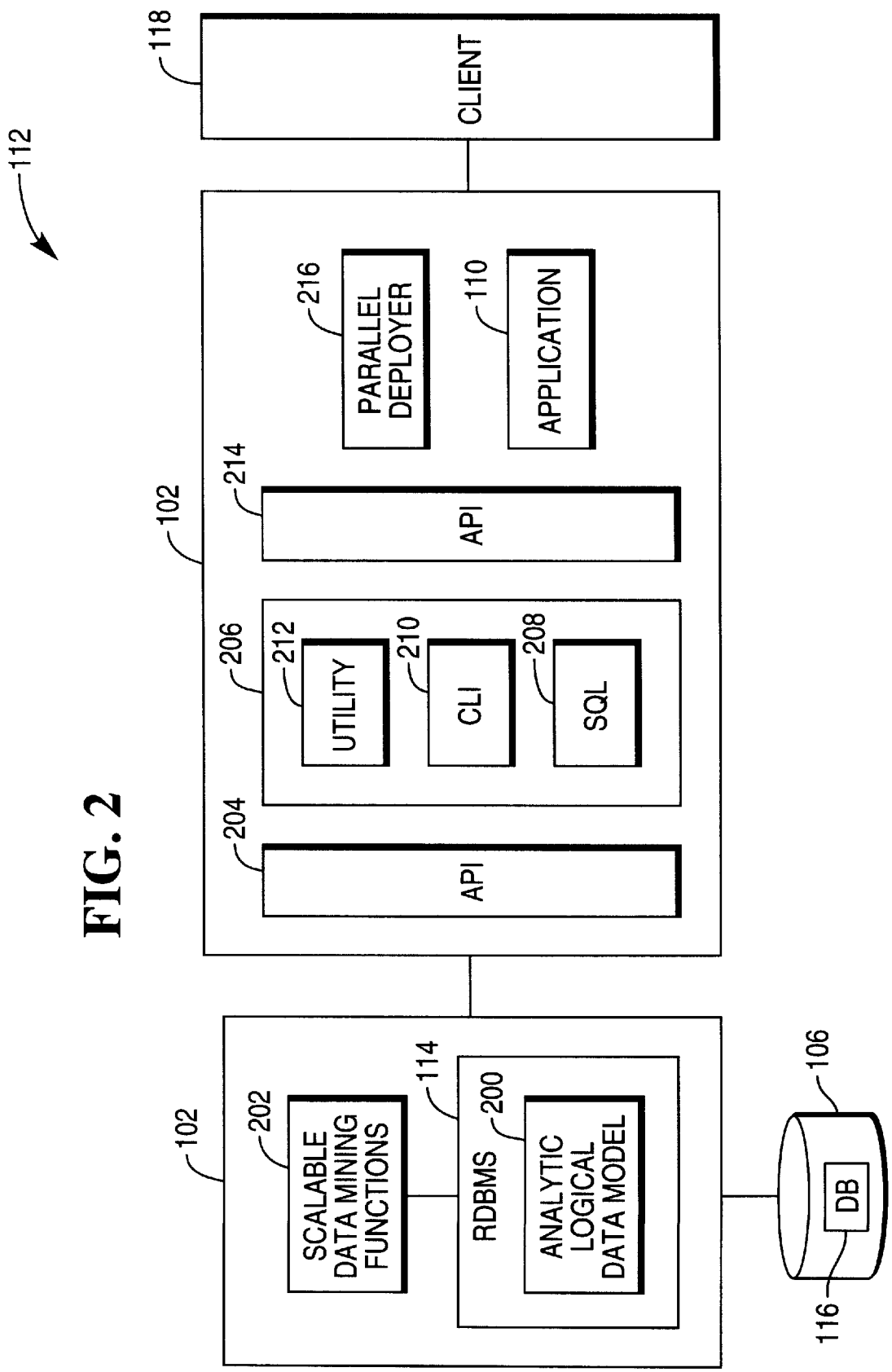
FIG. 2 is a block diagram that illustrates an exemplary logical architecture that could be used with the preferred embodiment of the present invention.

FIG. 2 is a block diagram that illustrates an exemplary logical architecture of the AAPC 112, and its interaction with the APPL 110, RDBMS 114, relational database 116, and Client 118, according to the preferred embodiment of the present invention. In the preferred embodiment, the AAPC 112 includes the following components:

An Analytic Logical Data Model (LDM) 200 that stores results from the advanced analytic processing in the RDBMS 114, One or more Scalable Data Mining Functions 202 that comprise complex, optimized SQL statements that perform advanced analytic processing in the RDBMS 114, An Analytic Application Programming Interface (API) 204 that provides a mechanism for an APPL 110 or other component to invoke the Scalable Data Mining Functions 202, One or more Analytic Algorithms 206 that can operate as standalone applications or can be invoked by another component, wherein the Analytic Algorithms 206 comprise:

Extended ANSI SQL 208 that can be used to implement a certain class of Analytic Algorithms 206, A Call Level Interface (CLI) 210 that can be used when a combination of SQL and programmatic iteration is required to implement a certain class of Analytic Algorithms 206, and A Data Reduction Utility Program 212 that can be used to implement a certain class of Analytic Algorithms 206 where data is first reduced using SQL followed by programmatic iteration.

An Analytic Algorithm Application Programming Interface (API) 214 that provides a mechanism for an APPL 110 or other components to invoke the Analytic Algorithms 206, A Parallel Deployer 216 that controls parallel executions of the results of an Analytic Algorithm 206 (sometimes referred to as an analytic model) that are stored in the Analytic LDM 200, wherein the results of executing the Parallel Deployer 216 are stored in the RDBMS 114.

Note that the use of these various components is optional, and thus only some of the components may be used in any particular configuration.

The preferred embodiment is oriented towards a multi-tier logical architecture, in which a Client 118 interacts with the various components described above, which, in turn, interface to the RDBMS 114 to utilize a large central repository of enterprise data stored in the relational database 116 for analytic processing.

In one example, a Client 118 interacts with an APPL 110, which interfaces to the Analytic API 204 to invoke one or more of the Scalable Data Mining Functions 202, which are executed by the RDBMS 114. The results from the execution of the Scalable Data Mining Functions 202 would be stored in an Analytic LDM 200 in the RDBMS 114.

In another example, a Client 118 interacts with one or more Analytic Algorithms 206 either directly or via the Analytic Algorithm API 214. The Analytic Algorithms 206 comprise SQL statements that may or may not include programmatic iteration, and the SQL statements are executed by the RDBMS 114. In addition, the Analytic Algorithms 206 may or may not interface to the Analytic API 204 to invoke one or more of the Scalable Data Mining Functions 202, which are executed by the RDBMS 114. Regardless, the results from the execution of the Analytic Algorithms 206 would be stored as an analytic model within the Analytic LDM 200 in the RDBMS 114.

In yet another example, a Client 118 interacts with the Parallel Deployer 216, which invokes parallel instances of the results of the Analytic Algorithms 206, sometimes referred to as an Analytic Model. The Analytic Model is stored in the Analytic LDM 200 as a result of executing an instance of the Analytic Algorithms 206. The results of executing the Parallel Deployer 216 are stored in the RDBMS 114.

In still another example, a Client 118 interacts with the APPL 110, which invokes one or more Analytic Algorithms 206 either directly or via the Analytic Algorithm API 214. The results would be stored in an analytic model within the Analytic LDM 200 in the RDBMS 114.

The overall goal is to significantly improve the performance, efficiency, and scalability of data mining operations by performing compute and/or I/O intensive operations in the various components. The preferred embodiment achieves this not only through the parallelism provided by the MPP computer system 100, but also from reducing the amount of data that flows between the APPL 110, AAPC 112, RDBMS 114, Client 118, and other components.

Those skilled in the art will recognize that the exemplary configurations illustrated and discussed in conjunction with FIG. 2 are not intended to limit the present invention. Indeed, those skilled in the art will recognize that other alternative configurations may be used without departing from the scope of the present invention. In addition, it should be understood that the present invention may also apply to other components than those disclosed herein.

Scalable Data Mining Functions

The Scalable Data Mining Functions 202 comprise complex, optimized SQL statements that are created, in the preferred embodiment, by parameterizing and instantiating the corresponding Analytic APIs 204. The Scalable Data Mining Functions 202 perform much of the advanced analytic processing for data mining applications, when performed by the RDBMS 114, without having to move data from the relational database 116.

The Scalable Data Mining Functions 202 can be categorized by the following functions:

Data Description: The ability to understand and describe the available data using statistical techniques. For example, the generation of descriptive statistics, frequencies and/or histogram bins.

Data Derivation: The ability to generate new variables (transformations) based upon existing detailed data when designing an analytic model. For example, the generation of predictive variables such as bitmaps, ranges, codes and mathematical functions.

Data Reduction: The ability to reduce the number of variables (columns) or observations (rows) used when designing an analytic model. For example, creating Covariance, Correlation, or Sum of Squares and Cross-Products (SSCP) Matrices.

Data Reorganization: The ability to join or denormalize pre-processed results into a wide analytic data set.

Data Sampling/Partitioning: The ability to intelligently request different data samples or data partitions. For example, hash data partitioning or data sampling.

The principal theme of the Scalable Data Mining Functions 202 is to facilitate analytic operations within the RDBMS 114, which process data collections stored in the database 116 and produce results that also are stored in the database 116. Since data mining operations tend to be iterative and exploratory, the database 116 in the preferred embodiment comprises a combined storage and work space environment. As such, a sequence of data mining operations is viewed as a set of steps that start with some collection of tables in the database 116, generate a series of intermediate work tables, and finally produce a result table or view.

Data Description

This category of functions provides a variety of descriptive statistical functions, giving the analyst an intimate knowledge of the data to be mined. Such descriptive statistical analysis is valuable for several reasons. First, it can provide business insight in its own right. Second, it uncovers data quality issues, which, if not corrected or compensated for, would jeopardize the accuracy of any analytic models that are based on the data. Next, it isolates the data that should be used in building analytic models. Further, some statistical processes used in analytic modeling require a certain type of distribution of data. Descriptive statistical analysis can determine the suitability of various data elements for model input and can suggest which transformations may be required for these data elements.

The Data Description components are shown in the following Table:

| Function | Description |
| --- | --- |
| STATS | Descriptive statistics for numeric column(s), including Count, Minimum, Maximum, Mean, Standard Deviation, Standard Mean Error, Variance, Coefficient of Variance, Skewness, Kurtosis, Uncorrected Sum of Squares, Corrected Sum of Squares, and Quantiles |
| VALUES | Count the number of values of various kinds for a given column |
| MODES | Calculate modality, the most frequently occurring value(s) for a column |
| BIN | Bin numeric column(s) giving counts with overlay and statistics options |
| BINPLUS | Automatically sub-bin numeric column(s) giving additional counts and isolate frequently occurring individual values. |
| FREQ | Compute frequency of column values or multi-column combined values |
| FREQWEB | Compute frequency of values for pairs of columns in column list |
| COR | Create a Pearson Product-Moment Correlation matrix |
| COV | Create a Covariance matrix |
| SSCP | Create a sum of squares and cross-products matrix |
| OVERLAP | Count overlapping column values in combinations of tables |

Data Derivation

This category of functions provides a variety of column derivations or transformations that are useful prior to designing the analytic model. Sometimes these derivations are required by the analytical modeling method to be used (for example, some methods may require categorical input, while other methods may require numeric input). Even when these derivations are not required by the analytical modeling method, the results of analytical modeling are greatly affected by the measures that can be derived to characterize some type of behavior or quality. This is one of the areas of data mining requiring the most trial and error, and reliance on past experience. Substantial timesaving can be gained by automating the derivation process, and insights from past experiences can be reused by saving and reapplying prior derivation techniques.

The Data Derivation functions are shown in the following Table:

| Function | Description |
| --- | --- |
| BINCODE | Derive binned numeric column - new column is bin number |
| DUMMYCODE | Dummy-code n-valued categorical column into 'n' 0/1 values |
| RECODE | Re-code n-valued categorical column into n or less new values |
| RESCALE | Scale numeric column(s) via range transformation |
| ZSCORE | Scale column(s) to Z-Score - the number of standard deviations from the mean |
| SIGMOID | Scale numeric column(s) via Sigmoidal transformation function |
| LOG | Scale numeric column(s) via base 10 logarithm function |
| LN | Scale numeric column(s) via natural logarithm function |
| EXP | Scale numeric column(s) via exponential function (e**column value) |
| POWER | Scale numeric column(s) by raising to some power |
| DERIVE | Derive numeric column(s) via user defined transformation function |
| RANK | Derive new column(s) by ranking column(s) or expression(s) based on order |
| QUANTILE | Derive new column(s) with Quantile 0 to n-1 based on order and n |
| CSUM | Derive cumulative sum of value expression based on sort expression |
| MAVG | Derive moving average of value expression based on width and order |
| MSUM | Derive moving sum of value expression based on width and order |
| MDIFF | Derive moving difference of value expression based on width and order |
| MLINREG | Derive moving linear regression value from expression, width, and order |
| BMAP | Multiple account/product ownership bitmap |
| BMAPTIME | Product ownership bitmap over multiple time periods |
| TRANINT | Derive counts, amount, percentage means and intensities from transaction summary |
| TRANVAR | Derive variabilities from transaction summary data |
| TRIG | Derive trigonometric values and their inverses, including sin, arcsin, cos, arccos, csc; arccsc, sec, arcsec, tan, arctan, cot, and arccot |
| HYPER | Derive hyperbolic values and their inverses, including sinh, arcsinh, cosh, arccosh, csch, arccsch, sech, arcsech, tanh, arctanh, coth, and arccoth |

Data Reduction

This category of functions provides utility-based matrix building operations to reduce the amount of data required for analytic algorithms. Numeric columns in potentially huge relational tables are reduced to a comparatively compact matrix (n-by-n if there are n-columns), which is delivered to the APPL 110, Client 118, or some other program for further analysis.

The Data Reduction functions are shown in the following Table:

| Function | Description |
| --- | --- |
| BLDMAT | Build one of three data reduction matrices, including: (1) Pearson-Product Moment Correlations; (2) Covariances; and (3) Sum of Squares and Cross Products (SSCP) |
| GETMAT | Export the resultant matrix and build either a flat file or a program to deliver the data to an outside application. |
| RSTMAT | Restart the BLDMAT process upon a failure. |

Data Reorganization

The functions in this category provide the ability to reorganize data by joining and/or denormalizing pre-processed results into a wide analytic data set. The result of these functions is a newly restructured table that has been constructed from one or more existing tables.

The Data Reorganization functions are shown in the following Table:

| Function | Description |
| --- | --- |
| Denormalize | Create new table denormalizing by removing key column(s) |
| Join | Join tables or views into combined result table |

Data Sampling/Partitioning

The functions in this category provide the ability to construct a new table containing a randomly selected subset of the rows in an existing table or view. Although the preferred embodiment provides the option of performing analytic operations on the entire data set, sampling is often necessary to create multiple data sets used for training, testing, and validation. Sampling can also be useful during simple trial periods when it would otherwise be unwieldy to perform an analytic process because of the volume of data available. This is especially true for compute intensive analytic modeling tasks, such as neural network modeling. However, analytic tasks, which can be classified as descriptive in nature, are ideally performed prior to sampling, and may in fact suggest data constraints that should be used before sampling.

Partitioning is similar to sampling but allows mutually distinct but all-inclusive subsets of data to be requested by separate processes. For example, a table can be partitioned into three distinct pieces.

The Data Sampling/Partitioning functions are shown in the following Table:

| Function | Description |
| --- | --- |
| Partition | Select a data partition, or multiple data partitions from a table using a database internal hashing technique. |
| Sample | Select a data sample, or multiple data samples of a specified size (or sizes) from a table using a database internal random selection technique. |

Those skilled in the art will recognize that the functions listed for each of the above-identified categories are merely exemplary and thus are not intended to be exhaustive of the category. Indeed, any number of different functions could be added to a category without departing from the scope of this invention.

Analytic Algorithms

The Analytic Algorithms 206 provide statistical and/or "machine learning" methods to create analytic models within the Analytic LDM 200 from the data residing in the relational database 116. Analytic Algorithms 206 that are completely data driven, such as association, can be implemented solely in Extended ANSI SQL 208. Analytic Algorithms 206 that require a combination of SQL and programmatic iteration, such as induction, can be implemented using the CLI 210. Finally, Analytic Algorithms 206 that require almost complete programmatic iteration, such as clustering, can be implemented using a Data Reduction Utility Program 212. This approach involves data pre-processing that reduces the amount of data that a non-SQL algorithm can then process.

The Analytic Algorithms 206 significantly improve the performance and efficiency of data mining operations by providing the technology components to perform advanced analytic operations directly against the RDBMS 114. In addition, the Analytic Algorithms 206 leverage the parallelism that exists in the MPP computer system 100, the RDBMS 114, and the database 116.

The Analytic Algorithms 206 provide data analysts with an unprecedented option to train and apply "machine learning" analytics against massive amounts of data in the relational database 116. Prior techniques have failed as their sequential design is not optimal in an RDBMS 114 environment. Because the Analytic Algorithms 206 are implemented in Extended ANSI SQL 208, through the CLI 210, and/or by means of the Data Reduction Utility Program 212, they can therefore leverage the scalability available on the MPP computer system 100. In addition, taking a data-driven approach to analysis, through the use of complete Extended ANSI SQL 208, allows people other than highly educated statisticians to leverage the advanced analytic techniques offered by the Analytic Algorithms 206.

Extended ANSI SQL

As mentioned above, Analytic Algorithms 206 that are completely data driven, such as affinity analysis, can be implemented solely in Extended ANSI SQL 208. Typically, these type of algorithms operate against a set of tables in the relational database 116 that are populated with transaction-level data, the source of which could be point-of-sale devices, automated teller machines, call centers, the Internet, etc. The SQL statements used to process this data typically build relationships between and among data elements in the tables. For example, the SQL statements used to process data from point-of-sale devices may build relationships between and among products and pairs of products. Additionally, the dimension of time can be added in such a way that these relationships can be analyzed to determine how they change over time. As the implementation is solely in SQL statements, the design takes advantage of the hardware and software environment of the preferred embodiment by decomposing the SQL statements into a plurality of sort and merge steps that can be executed concurrently in parallel by the MPP computer system 100.

Call-Level Interface

As mentioned above, Analytic Algorithms 206 that require a mix of programmatic iteration along with Extended ANSI SQL statements, such as inductive inference, can be implemented using the CLI 210. Whereas the SQL approach is appropriate for business problems that are descriptive in nature, inference problems are predictive in nature and typically require a training phase where the APPL 110 "learns" various rules based upon the data description, followed by testing and application, and where the rules are validated and applied against a new data set. This class of algorithms are compute-intensive and historically can not handle large volumes of data because they expect the analyzed data to be in a specific fixed or variable flat file format.

Most implementations first extract the data from the database 116 to construct a flat file and then execute the "train" portion on this resultant file. This method is slow and limited by the amount of memory available in the computer system 100. This process can be improved by leveraging the relational database 116 to perform those portions of the analysis, instead of extracting all the data.

When SQL statements and programmatic iteration are used together, the RDBMS 114 can be leveraged to perform computations and order data within the relational database 116, and then extract the information using very little memory in the APPL 110. Additionally, computations, aggregations and/or ordering can be run in parallel, because of the massively parallel nature of the RDBMS 114.

Data Reduction Utility Program

As mentioned above, Analytic Algorithms 206 that can operate on a reduced or scaled data set, such as regression or clustering, the Data Reduction Utility Program 212 can be used. The problem of creating analytic models from massive amounts of detailed data has often been addressed by sampling, mainly because compute intensive algorithms cannot handle large volumes of data. The approach of the Data Reduction Utility Program 212 is to reduce data through operations such as matrix calculations or histogram binning, and then use this reduced or scaled data as input to a non-SQL algorithm. This method intentionally reduces fine numerical data details by assigning them to ranges, or bins, correlating their values or determining their covariances. The capacity of the preferred embodiment for creating these data structures from massive amounts of data in parallel gives it a special opportunity in this area.

Analytic Logical Data Model

The Analytic LDM 200, which is integrated with the relational database 116 and the RDBMS 114, provides logical entity and attribute definitions for advanced analytic processing, i.e., the Scalable Data Mining Functions 202 and Analytic Algorithms 206, performed by the RDBMS 114 directly against the relational database 116. These logical entity and attribute definitions comprise metadata that define the characteristics of data stored in the relational database 116, as well as metadata that determines how the RDBMS 114 performs the advanced analytic processing. The Analytic LDM 200 also stores processing results from this advanced analytic processing, which includes both result tables and derived data for the Scalable Data Mining Functions 202, Analytic Algorithms 206, and the Parallel Deployer 216. The Analytic LDM 200 is a dynamic model, since the logical entities and attributes definitions change depending upon parameterization of the advanced analytic processing, and since the Analytic LDM 200 is updated with the results of the advanced analytic processing.

Data Description Functions—Results Tables and Column Definitions

The following describes the results tables and column definitions for the Data Description functions.

BIN Results Table

This table supports the BIN function to bin numeric column(s) giving counts including optional overlay variables and statistics options. The BIN function takes as parameters a table name, the name of one or more numeric columns, and one of the following:

Desired number of equal sized bins,

Bin width,

Boundary values (with possibly any spacing), or

Number of bins with nearly equal number of values in each bin.

This function calculates the boundaries of each bin along with the bin number, count, and percentages over the requested rows (which will always add up to 100). It optionally further provides sub-totals within each bin of the count, percentage within the bin, and percentage overall for each value or combination of values of one or more overlaid columns. A further option is provided to accumulate the values of a binned column or another column as a sum, mean, or standard deviation.

BINPLUS Results Table

This table supports the BINPLUS function that modifies the computed equal sized bins to include a separate bin for each spike value and to further subdivide an overpopulated bin, returning counts and boundaries for each resulting bin. The BINPLUS function takes as parameters a table name, the name of a numeric column, the desired number of equal sized bins, the frequency percentage above which a value should be treated as a "spike", and a similar percentage above which a bin should be further subdivided. Subdividing is performed by first subdividing by the same number of bins and then merging this with a subdivision in the region of the mean value within the bin. Subdivision near the mean is done by subdividing by the same number of bins the region around the mean, −/+ the standard deviation (if outside of the original bin, then from the bin boundary to the mean value). Subdividing may optionally be done using quantiles, giving approximately equally distributed bins.

This function differs from the BIN function in that the BIN function includes spike values in the precomputed bins, which can distort the bin counts, and does not subdivide overpopulated bins. This function also does not have many of the specialized options of the BIN function, such as binning by width, binning by boundary, binning by quantile, overlays, stats, or binning over multiple dimensions.

Note that, generally, the beginning range values are inclusive and the ending range values are exclusive. There are some exceptions to this:

the last ending range value is inclusive, the ending range value of a spike is inclusive (because the beginning and ending values of a spike are the same), the beginning range value of a bin that follows and adjoins a spike is exclusive (since this value is the same as the spike value), and the ending range value of a quantile sub-bin is inclusive.

COR Results Table

This table supports the COR function that creates a "small" Pearson Product-Moment Correlation Matrix. This function takes as parameters a table name and a list of numeric columns. It then calculates the correlation matrix of all pair-wise combinations of the variables with values stored in the lower triangular portion, 1's along the diagonal, and null values in the upper triangular portion instead of the actual symmetric values.

COV Results Table

This table supports the COV function to create a Covariance Matrix. This function takes as parameters a table name and a list of numeric columns. It then calculates the covariance matrix of all pair-wise combinations of the variables with values stored in the lower triangular portion and along the diagonal, and null values in the upper triangular portion, instead of the actual symmetric values.

SSCP Results Table

This table supports the SSCP function to create a "Sum of Squares and Cross Products" Matrix. This function takes as parameters a table name and a list of numeric columns. It then calculates the sum of squares and cross-products matrix for all pair-wise combinations of the variables, with values stored in the lower triangular portion and along the diagonal, and null values in the upper triangular portion, instead of the actual symmetric values.

FREQ Results Table

This table supports the FREQ function to compute the frequency of column values or multi-column combined values when cross-tabs are not used. This function takes as parameters a table name and the name of one or more columns, and calculates the number of occurrences of each value of the column or columns individually or in combination, along with the percentage of all rows in the selected table.

Note that if the user requests the frequencies in combination (by selecting a "crosstab" parameter), a different results table is created. Optionally, cumulative statistics and rank are included.

FREQWEB Results Table

This table supports the FREQWEB function to compute the frequency of values for pairs of columns in column list. This function takes as parameters a table name and a list of columns, and counts the number of occurrences in the table of each pair-wise combination of distinct values within the columns specified by the list, including the percentage of the total number of rows.

Alternatively, given two lists of columns, the function will combine each column in the first list with each column in the second list and count the number of occurrences of each combination of values as above.

MODES Results Table

This table supports the MODES function to calculate modes, or the most frequently occurring value(s) for a column. This function takes as parameters a table name and column name, and determines the value(s) of the column that occurs most frequently. Note that this may result in more than one row as more than one value can occur the maximum number of times. By default, the smaller of these maximum occurring values is returned along with the number of modes or modality. Optionally, the user can request that all modal values be returned. The count and a percentage are also returned either the percentage of all selected records or, if the group option is used, the percentage within each group.

OVERLAP Results Table

This table supports the OVERLAP function to count overlapping column values in combinations of tables. This function takes as parameters a column name and a list of table names, and calculates the number of instances of that column which each pair-wise combination of tables has in common.

STATS Results Table

This table supports the STATS function to calculate descriptive statistics for numeric column(s). This function takes as parameters a table name and the name of a numeric column or column(s), and derives descriptive statistics for the data in the column(s). Statistics provided include minimum, maximum, mean, standard deviation, skewness, kurtosis, standard mean error, coefficient of variance, variance, sum, uncorrected sum of squares and corrected sum of squares.

In addition to these basic numerical statistics, the user can request an extended option to additionally obtain the result of the values, modes and quantile functions, as well as the top 5 and bottom 5 distinct values along with the basic statistics. With the extended option, since modes can ordinarily return more than one value, only the minimum modal value is utilized and an additional column called "xnbrmodes" for the number of modes or modality is returned. As with modes, the top 5 and bottom 5 values are determined as distinct values, with counts also provided.

VALUES Results Table

This table supports the VALUES function to count the number of values of various kinds for a given column. This function takes as parameters a table name and the name of a column, and calculates the number of:

Rows,

Rows with non-null values,

Rows with null values,

Unique values

Rows with value 0,

Rows with a positive value,

Rows with a negative value, and

Rows containing blanks in the given column.

Data Derivation Functions—Results Tables and Column Definitions

The following describes the results tables and column definitions for the Data Derivation functions.

BINCODE Results Table

This table supports the BINCODE function that takes as parameters a table name, the name of a numeric column, and either the desired number of equal sized bins, the bin width, the boundary values with any spacing, or the number of bins with nearly equal number of values in each bin. This function derives a new column with the bin number as the value.

RECODE Results Table

This table supports the RECODE function that takes as parameters a table name, the name of a column, the old column values and new column values, and key column name. This function translates the old column values into new user specified ones.

DUMMYCODE Results Table

This table supports the DUMMYCODE function that takes as parameters a table name, the name of a column, and a list of values to "dummy-code". This function creates a new column for each listed value, with a value of 0 or 1 depending on whether that value is assumed by the original variable. A list of result column names, one per value, is used to name the resulting new columns.

BMAP Results Table

This table supports the BMAP function that takes as parameters an account/product ownership summary table, (one row for each account/product of owned by each customer), a start and end date, and an account/product type, to derive a bit map variable reflecting customer ownership in a particular time period for a particular account/product list.

Each bit position in the derived bitmap represents a particular account/product type, and is either 0 if an account/product is not owned, or 1 if one or more accounts/products of the given type is owned in the given time period.

BMAPTIME Results Table

This table supports the BMAPTIME function that takes as parameters an account/product ownership summary table, (one row for each account/product of owned by each customer), a start and end date, and an account/product type, to derive a bit map variable reflecting customer ownership in a particular time period list for a particular account/product. Each bit position in the derived bitmap represents a particular time period and is either 0 if an account/product is not owned, or 1 if one or more accounts/products of the given type is owned in the given time period.

SIGMOID Results Table

This table supports the SIGMOID function that takes as parameters a table name, the name of a numeric column and the key column for the result set, to derive the sigmoid transformation of the values of the column.

LOG Results Table

This table supports the LOG function that takes as parameters a table name, the name of a numeric column, and the key column for the result set, to scale the column to its base 10 logarithm value.

ZSCORE Results Table

This table supports the ZSCORE function that takes as parameters a table name, the name of a numeric column, and the key column for the result set, to transform the column into their z score value, which comprises the number of standard deviations a value is away from the mean.

POWER Results Table

This table supports the POWER function that takes as parameters a table name, the name of a numeric column, the key column for the result set, and the power to raise it to, to generate transformed values of the column.

LN Results Table

This table supports the LN function that takes as parameters a table name, the name of a numeric column, and the key column for the result set, to scale the column to its natural logarithm value.

EXP Results Table

This table supports the EXP function that takes as parameters a table name, the name of a numeric column, and the key column for the result set, to scale the column via the exponential function.

RESCALE Results Table

This table supports the RESCALE function that takes as parameters a table name, the name of a numeric column, the key column for the result set, and a left and/or right value boundary, to re-scale the values of the column to fall within the requested boundaries.

DERIVE Results Table

This table supports the DERIVE function that takes as parameters a table name, and one or more columns and/or SQL expressions, to derive a new table defined by the columns or expressions. This function is useful for deriving several new columns at once using user-specified SQL expressions.

RANK Results Table

This table supports the RANK function that takes as parameters a table name, the sort expression list by which to compute rank, the result column, and the key column for the result set, to derive a new column for each, indicating the rank of the rows when sorted by the specified column or expression.

QUANTILE Results Table

This table supports the QUANTILE function that takes as parameters a table name, the sort expression list by which to compute quantile, the number of quantile partitions, the result column, and the key column for the result set, to derive a new column for each sort expression list, giving the quantile partition that each row belongs in based on the sort list.

MAVG Results Table

This table supports the MAVG function that takes as parameters a table name, one or more value expressions, widths and corresponding sort expression lists, the result column, and the key column for the result set, to derive a new column for each value expression giving the moving average of the value expression over "width" rows when sorted by the sort expression list. For rows that have less than width −1 rows preceding it in the table or group, the function is computed using all preceding rows.

MDIFF Results Table

This table supports the MDIFF function that takes as parameters a table name, one or more value expressions, widths and corresponding sort expression lists, the result column, and the key column for the result set, to derive a new column for each value expression giving the moving difference of the value expression when the rows are sorted by the sort expression list. The moving difference is calculated as the difference between the current value and the Nth previous value, where N equals the width. The moving difference is NULL if there is no Nth preceding row in the table or group.

CSUM Results Table

This table supports the CSUM function that takes as parameters a table name, one or more value expressions, widths and corresponding sort expression lists, the result column, and the key column for the result set, to derive a new column for each value expression giving the cumulative sum of the value expression when sorted by the sort expression list. When a group clause is specified, the sum is accumulated only over the rows in each group (the start of a group resets the accumulated sum to 0).

MSUM Results Table

This table supports the MSUM function that takes as parameters a table name, one or more value expressions, widths and corresponding sort expression lists, the result column, and the key column for the result set, to derive a new column for each value expression giving the moving sum of the value expression over "width" rows when sorted by the sort expression list. For rows that have less than width −1 rows preceding it in the table or group, the function is computed using all preceding rows.

MLINREG Results Table

This table supports the MLINREG function that takes as parameters a table name, one or more value expressions, widths and corresponding sort expression lists, the result column, and the key column for the result set, to derive a new column giving the moving linear regression extrapolation of the value expression over "width" rows when sorted by the sort expression, using the sort expression as the independent variable. The current and width −1 rows after sorting are used to calculate the simple least squares linear regression. For rows that have less than width −1 rows preceding it in the table or group, the function is computed using all preceding rows. The first two rows in the table or group however will have the NULL value.

TRANINT Results Table

This table supports the TRANINT function that derives counts, amounts, percentage means, and intensities from a transaction summary file. This function takes as parameters a start time period and end time period to calculate average period counts, amounts, percentage means, and intensity measures from previously computed transaction summary data.

TRANVAR Results Table

This table supports the TRANVAR function that derives variabilities from transaction summary data. This function takes as parameters a start time period and end time period, and transaction type to calculate the average periodic transaction counts and transaction amounts by customer and transaction type (such as debit or credit) from a transaction summary table.

Data Reorganization—Results Tables and Column Definitions

The following describes the results tables and column definitions for the Data Reorganization functions.

JOIN Results Table

This table supports the JOIN function that joins tables together into a combined result table. This function takes as parameters a list of tables, keys, and column lists to combine new derived variables into an analytic data set, prior to building a matrix or analytic model.

By default, an INNER join is performed on the given tables based on the given key columns. This means that rows will be returned only for key column values that appear in both tables. By option, a LEFT outer join can be requested, which returns rows for all key column values found in the first table specified, and fills in any missing values from the other tables with null values.

DENORM Results Table

This table supports the DENORM function that selects or creates a new denormalized table. This function takes as parameters a table name, the name of key column(s) to remove, the names of key columns to retain, the names of remaining columns to denormalize, and the values of the removed key columns to denormalize by. All columns other than the retained key and denormalized columns are dropped in the new table, unless they are specified as retained columns. However, in this case, they should already be denormalized, i.e., have the same value for each of the removed key columns.

New columns created as a result of denormalization each have new names formed by preceding their name with a combination of the values of the removed keys and preceded by an underscore character. The user may, however, specify the prefix to be used for any of the key values.

Data Sampling/Partitioning Functions—Results Tables and Column Definitions

The following describes the results tables and column definitions for the Data Sampling/Partitioning functions.

SAMPLE Results Table

This table supports the SAMPLE function that selects one or more samples from a table by size or fraction. When multiple samples are requested and the select option is used, an extra column (xsampleid) is returned to identify the sample that a row belongs to, which may be referenced in an optional order by clause. The sample function returns a pseudo-random selection of rows, which will likely vary from one run to the next.

PARTITION Results Table

This table supports the PARTITION function that selects a specific partition or range of partitions from a table using a hash key. For example, the third partition out of ten might be requested, or partitions 1 through 3 out of 10 might be requested.

To select a specific partition, the start and end partition are set to the same selected value. If a range of partitions is requested and the select option is used, the partition number is also returned as "xpartid", which may be used with the order option.

Analytic Metadata—Table and Column Definition

Two different types of analytic metadata are required by the functions: (1) data reduction metadata for the matrix builder; and (2) transaction and account summary metadata for the TRANINT and TRANVAR functions, and the BMAP and BMAPTIME functions, respectively.

Matrix Builder Tables

Specialized metadata is kept for the large Covariance, Correlation and Sum of Squares and Cross-Products Matrices. This metadata has been designed to allow matrices with more that 255 variables to be defined within the RDBMS. Additionally, it has been tuned specifically for performance reasons when dealing with this particular type of wide data set. Three tables make up this metadata, as described in more detail below.

These entities or attributes support the BLDMAT, GETMAT and RSTMAT Matrix Builder Application to either:

Build and store a large reduction matrix,

Get the stored values in a large reduction matrix, or

Restart the building of a large reduction matrix.

These functions are valid for any of the supported reduction matrix types, namely correlation (COR), covariance (COV), and sum of squares and cross products (SSCP). Note that the functions for viewing small matrices, specifically COR, COV and SSCP, exist in addition to the Matrix Builder application.

Matrix Type Table

This table supports the BLDMAT, GETMAT and RSTMAT functions to track the various types of matrices (COR, COV, SSCP) and their associated descriptions.

Matrix Columns Table

This table supports the BLDMAT, GETMAT and RSTMAT functions to track internal table and column indexes, and their associated names and aliases.

Matrix loin Table

This table supports the BLDMAT, GETMAT and RSTMAT functions to help keep track of what columns were used to join multiple tables.

Matrix Values Table

This table supports the BLDMAT, GETMAT and RSTMAT functions to persist the actual matrix calculation, using the internal table, column and select identifiers.

Summary Data Tables

The second type of metadata is comprised of summarized data. Several of the derivation functions (namely BMAP, BMAPTIME, TRANINT and TRANVAR) require "input" data sets that are comprised of summarized account and transaction level data. Once these data sets are built, these functions can generate a variety of new columns.

BMAP ACCTS Table

This table supports the BMAP and BMAPTIME functions to derive a bit map variable reflecting either customer ownership in a particular time period for a particular account/product list, or a bit map variable reflecting customer ownership of a particular product for a particular time period list.

TRAN ACCTS Table

This table supports the TRANINT and TRANVAR functions to derive counts, amounts, percentage means and intensities from a transaction summary file, or variabilities from transaction summary data.

Logic of the Preferred Embodiment

Flowcharts which illustrate the logic of the preferred embodiment of the present invention are provided in FIGS.

3, 4 and 5. Those skilled in the art will recognize that this logic is provided for illustrative purposes only and that different logic may be used to accomplish the same results.

Figure 3:
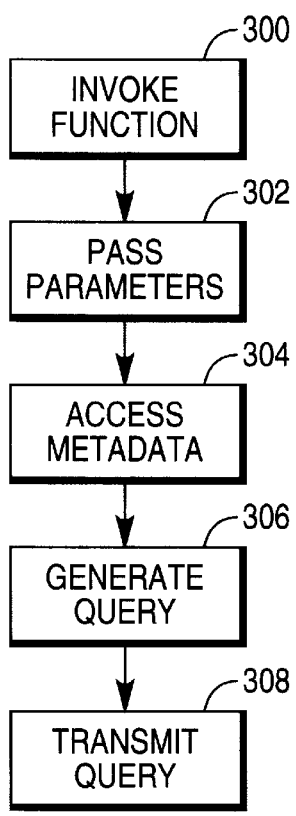
FIGS. 3, 4 and 5 are flowcharts that illustrate exemplary logic performed according to the preferred embodiment of the present invention.

Referring to FIG. 3, this flowchart illustrates the logic of the Scalable Data Mining Functions 202 according to the preferred embodiment of the present invention.

Block 300 represents the one or more of the Scalable Data Mining Functions 202 being created via the API 204. This may entail, for example, the instantiation of an object providing the desired function.

Block 302 represents certain parameters being passed to the API 204, in order to control the operation of the Scalable Data Mining Functions 202.

Block 304 represents the metadata in the Analytic LDM 200 being accessed, if necessary for the operation of the Scalable Data Mining Function 202.

Block 306 represents the API 204 generating a Scalable Data Mining Function 204 in the form of a data mining query based on the passed parameters and optional metadata.

Block 308 represents the Scalable Data Mining Function 204 being passed to the RDBMS 114 for execution.

Figure 4:
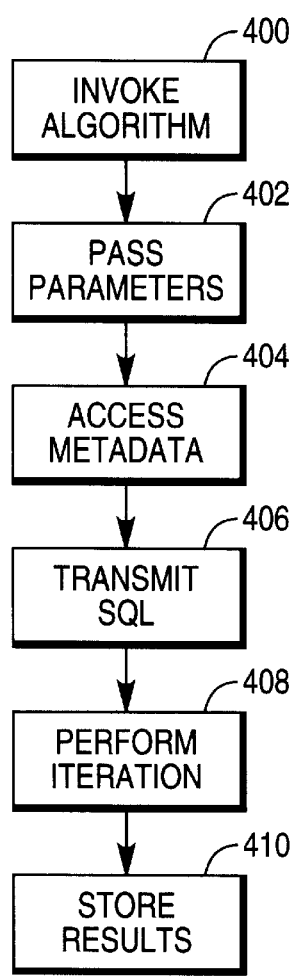

Referring to FIG. 4, this flowchart illustrates the logic of the Analytic Algorithms 206 according to the preferred embodiment of the present invention.

Block 400 represents the Analytic Algorithms 206 being invoked, either directly or via the Analytic Algorithm API 214.

Block 402 represents certain parameters being passed to the Analytic Algorithms 206, in order to control their operation.

Block 404 represents the metadata in the Analytic LDM 200 being accessed, if necessary for the operation of the Analytic Algorithms 206.

Block 406 represents the Analytic Algorithms 206 passing SQL statements to the RDBMS 114 for execution and Block 408 optionally represents the Analytic Algorithms 206 performing programmatic iteration. Those skilled in the art will recognize that the sequence of these steps may differ from those described above, in that the sequence may not include both steps, it may include additional steps, and it may include iterations of these steps.

Block 410 represents the Analytic Algorithms 206 storing results in the Analytic LDM 200.

Figure 5:
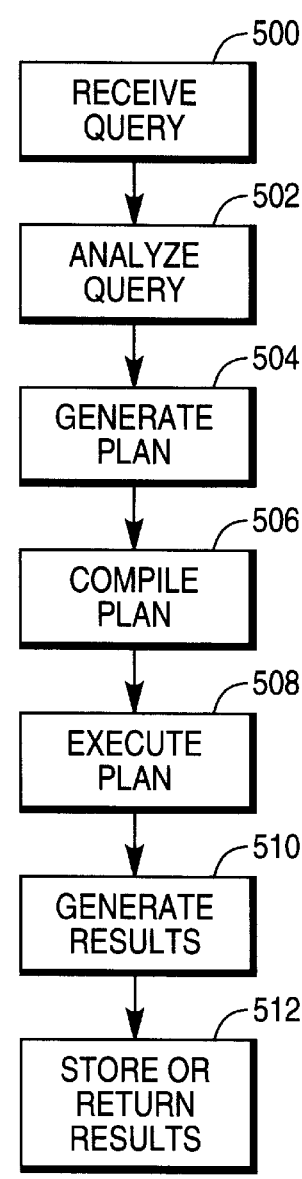

Referring to FIG. 5, this flowchart illustrates the logic performed by the RDBMS 114 according to the preferred embodiment of the present invention.

Block 500 represents the RDBMS 114 receiving a query or other SQL statements.

Block 502 represents the RDBMS 114 analyzing the query.

Block 504 represents the RDBMS 114 generating a plan that enables the RDBMS 114 to retrieve the correct information from the relational database 116 to satisfy the query.

Block 506 represents the RDBMS 114 compiling the plan into object code for more efficient execution by the RDBMS 114, although it could be interpreted rather than compiled.

Block 508 represents the RDBMS 114 initiating execution of the plan.

Block 510 represents the RDBMS 114 generating results from the execution of the plan.

Block 512 represents the RDBMS 114 either storing the results in the Analytic LDM 200, or returning the results to the Analytic Algorithm 206, APPL 110, and/or Client 118.

CONCLUSION

This concludes the description of the preferred embodiment of the invention. The following describes an alternative embodiment for accomplishing the same invention. Specifically, in an alternative embodiment, any type of computer, such as a mainframe, minicomputer, or personal computer, could be used to implement the present invention.

In summary, the present invention discloses a method, apparatus, and article of manufacture for performing data mining applications in a massively parallel relational database management system. An analytic logical data model (LDM) provides logical entity and attribute definitions for advanced analytic processing performed by the relational database management system directly against the relational database.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented system for performing data mining applications, comprising:
   (a) a computer having one or more data storage devices connected thereto, wherein a relational database is stored on one or more of the data storage devices;
   (b) a relational database management system, executed by the computer, for accessing the relational database stored on the data storage devices;
   (c) an analytic logical data model (LDM) that provides logical entity and attribute definitions for advanced analytic processing performed by the relational database management system directly against the relational database, wherein the advanced analytic processing comprise one or more scalable data mining functions and the scalable data mining functions are selected from a group of functions comprising Data Description functions, Data Derivation functions, Data Reduction functions, Data Reorganization functions, Data Sampling functions, and Data Partitioning functions.

2. The system of claim 1, wherein the analytic logical data model stores processing results from the advanced analytic processing.

3. The system of claim 1, wherein the analytic logical data model stores metadata that determines how to perform the advanced analytic processing.

4. The system of claim 1, wherein advanced analytic processing comprise one or more analytic algorithms.

5. The system of claim 4, further comprising a parallel deployer, executed by the computer, for managing parallel invocations of the analytic algorithms.

6. The system of claim 1, wherein the analytical logical data model stores results from the Data Description functions that comprise descriptive statistical data.

7. The system of claim 1, wherein the analytical logical data model stores results from the Data Description functions that are selected from a group comprising:
   (1) descriptive statistics for one or more numeric columns, wherein the statistics are selected from a group comprising count, minimum, maximum, mean, standard deviation, standard mean error, variance, coefficient of variance, skewness, kurtosis, uncorrected sum of squares, corrected sum of squares, and quantiles,
   (2) a count of values for a column,
   (3) a calculated modality for a column,
   (4) one or more bin numeric columns of counts with overlay and statistics options, (5) one or more automatically sub-binned numeric columns giving additional counts and isolated frequently occurring individual values, (6) a computed frequency of one or more column values, (7) a computed frequency of values for pairs of columns in a column list, (8) a Pearson Product-Moment Correlation matrix, (9) a Covariance matrix,

(10) a sum of squares and cross-products matrix, and

(11) a count of overlapping column values in one or more combinations of tables.

8. The system of claim 1, wherein the analytical logical data model stores results from the Data Derivation functions comprising column derivations or transformations.

9. The system of claim 1, wherein the analytical logical data model stores results from the Data Derivation functions that arc selected from a group comprising:

(1) a derived binned numeric column wherein a new column is bin number, (2) a n-valued categorical column dummy-coded into "n" 0/1 values, (3) a n-valued categorical column recoded into n or less new values, (4) one or more numeric columns scaled via range transformation, (5) one or more columns scaled to a z-score that is a number of standard deviations from a mean, (6) one or more numeric columns scaled via a sigmoidal transformation function, (7) one or more numeric columns scaled via a base 10 logarithm function, (8) one or more numeric columns scaled via a natural logarithm function, (9) one or more numeric columns scaled via an exponential function,

(10) one or more numeric columns raised to a specified power,

(11) one or more numeric columns derived via user defined transformation function,

(12) one or more new columns derived by ranking one or more columns or expressions based on order,

(13) one or more new columns derived with quantile 0 to n−1 based on order and n,

(14) a cumulative sum of a value expression based on a sort expression,

(15) a moving average of a value expression based on a width and order,

(16) a moving sum of a value expression based on a width and order,

(17) a moving difference of a value expression based on a width and order,

(18) a moving linear regression value derived from an expression, width, and order,

(19) a multiple account/product ownership bitmap,

(20) a product ownership bitmap over multiple time periods,

(21) one or more counts, amount, percentage means and intensities derived from a transaction summary,

(22) one or more variabilities derived from transaction summary data,

(23) one or more derived trigonometric values and their inverses, including sin, arcsin, cos, arccos, csc, arccsc, sec, arcsec, tan, arctan, cot, and arccot, and

(24) one or more derived hyperbolic values and their inverses, including sinh, arcsinh, cosh, arccosh, csch, arccsch, sech, arcsech, tanh, arctanh, coth, and arccoth.

10. The system of claim 1, wherein the analytical logical data model stores results from the Data Reduction functions comprising one or more matrices.

11. The system of claim 1, wherein the analytical logical data model stores results from the Data Reduction functions that are selected from a group comprising:

(1) build one or more data reduction matrices selected from a group comprising: (i) a Pearson-Product Moment Correlations (COR) matrix; (ii) a Covariances (COV) matrix; and (iii) a Sum of Squares and Cross Products (SSCP) matrix, (2) export a resultant matrix, and (3) restart a matrix operation.

12. The system of claim 1, wherein the analytical logical data model stores metadata for the Data Reduction functions.

13. The system of claim 1, wherein the analytical logical data model stores metadata for the Data Reduction functions selected from a group comprising:

(1) metadata to track the matrix type and its associated descriptions, (2) metadata to track internal table and column indexes, and their associated names and aliases, (3) metadata to track what columns are used to join multiple tables, (4) metadata to persist matrix calculations, using the internal table, column and select identifiers.

14. The system of claim 1, wherein the analytical logical data model stores results from the Data Reorganization comprising a wide analytic data set resulting from data reorganized by joining or de-normalizing pre-processed results.

15. The system of claim 1, wherein the analytical logical data model stores results from the Data Reorganization functions that are selected from a group comprising:

(1) a de-normalized new table created by removing one or more key columns from another table, and (2) a combined result table created by joining a plurality of tables or views.

16. The system of claim 1, wherein the analytical logical data model stores results from the Data Sampling function comprising a new table constructed from a randomly selected subset of the rows in an existing table or view.

17. The system of claim 1, wherein the analytical logical data model stores results from the Data Sample function comprising one or more data samples of specified sizes selected from a table.

18. The system of claim 1, wherein the analytical logical data model stores results from the Data Partitioning function comprising a new table constructed from at least one randomly selected subset of rows in an existing table or view, wherein the subsets are mutually distinct but all-inclusive subsets of data.

19. The system of claim 1, wherein the analytical logical data model stores results from the Data Partitioning function comprising one or more data partitions selected from a table using a database internal hashing technique.

20. A method for performing data mining applications, comprising:

(a) storing a relational database on one or more data storage devices connected to a computer;

(b) accessing the relational database stored on the data storage devices using a relational database management system executed by the computer; and (c) providing logical entity and attribute definitions in an analytic logical data model (LDM) to support advanced analytic processing performed by the relational database management system directly against the relational database, wherein the advanced analytic processing comprise one or more scalable data mining functions and the scalable data mining functions are selected from a group of functions comprising Data Description functions, Data Derivation functions, Data Reduction functions, Data Reorganization functions, Data Sampling functions, and Data Partitioning functions.

21. An article of manufacture comprising logic embodying a method for performing data mining applications, comprising:

(a) storing a relational database on one or more data storage devices connected to a computer;

(b) accessing the relational database stored on the data storage devices using a relational database management system executed by the computer; and (c) providing logical entity and attribute definitions in an analytic logical data model (LDM) to support advanced analytic processing performed by the relational database management system directly against the relational database, wherein the advanced analytic processing comprise one or more scalable data mining functions and the scalable data mining functions are selected from a group of functions comprising Data Description functions, Data Derivation functions, Data Reduction functions, Data Reorganization functions, Data Sampling functions, and Data Partitioning functions.

* * * * *